Sept. 30, 1969    P. J. SNYDER    3,469,416
UNIVERSAL SPINDLE COUPLING AND THE LIKE
Filed Jan. 16, 1967    2 Sheets-Sheet 1

INVENTOR
Peter J. Snyder
BY
ATTORNEYS

Sept. 30, 1969    P. J. SNYDER    3,469,416
UNIVERSAL SPINDLE COUPLING AND THE LIKE
Filed Jan. 16, 1967    2 Sheets-Sheet 2

INVENTOR
Peter J. Snyder
BY
ATTORNEYS

United States Patent Office
3,469,416
Patented Sept. 30, 1969

3,469,416
UNIVERSAL SPINDLE COUPLING
AND THE LIKE
Peter J. Snyder, 6723 Smithfield St.,
McKeesport, Pa. 15135
Filed Jan. 16, 1967, Ser. No. 609,617
Int. Cl. F16d 3/76
U.S. Cl. 64—7
5 Claims

ABSTRACT OF THE DISCLOSURE

The universal coupling is intended primarily for transmission of large forces such as occurring in steel rolling mills. The coupling is provided with bearings which are removable without disassembling the entire coupling. Previously, pin and slipper bearings have been utilized, which require frequent coupling disassembly to replace worn-out slippers. The disclosed coupling utilizes a modified guide pin and slipper arrangement, positioned so as not to be subject to wear. Torque forces are transmitted through symmetrical bearings which are not subject to the fractures usually occuring in conventional slipper bearings and, therefore, last considerably longer. The disclosed bearings can be inserted and removed at the sides of the coupling without disassembling the coupling. When inserted, the bearings are retained by removable retaining plates. In rolling mill couplings, the existing coupling heads can be used without modification as parts of the new coupling.

---

The present invention is an improvement upon the universal couplings described and claimed in my Patent No. 3,205,680 and in my copending application Ser. No. 487,234, entitled Universal Coupling System and the Like, filed Sept. 14. 1965.

This invention relates to universal couplings or joints and the like, and more particularly to rugged and essentially trouble-free universal spindle couplings for the turning of rolls or metal rolling mills, tube mills, and other equipment having rotating components in which the axis of the driven shaft or shafts therefor is not always coincident with the axis of the driving shaft or shafts.

Although my invention is described primarily in connection with universal spindle couplings employed for driving work rolls for rolling mills and the like, it will be obvious as this description proceeds that my invention is equally applicable in other types and forms of universal couplings and joints.

Almost all of the universal spindle couplings employed at the present time in rolling mills and the like are of the slipper type, with the slippers being made in most cases of bronze, and in a few cases of nylon or phenolic resin compounds. A study of the geometrical or asymmetrical motions of the slippers employed in the conventional spindle coupling reveals the exertion of tremendous forces adjacent the four corners of the slippers as the spindle is being rotated at any angle other than the horizontal (the greater the angle—the greater the force). These pressures result in flexing of the slippers a number of times during every revolution of the spindle coupling with the result that rapid wear and breakage occurs therein in those areas adjacent the corners of the slippers. Moreover, similar and opposite forces are exerted upon the adjacent portions of the cylindrical bores in the coupling in which the slippers are seated. Although the slippers are fabricated from much softer materials, the tremendous pressures thus exerted eventually wear the bores in the spindle head to an oval shape producing a loose fit which creates a backlashing or stuttering condition as the spindle revolves. Of course, these conditions are aggravated enormously by any lateral misalignment between the pinion stand and the mill stand. Obviously, too, a large proportion of driving force supplied to the coupling is wasted in the flexing of the slippers and in the wearing of the slippers and coupling parts.

Because of the tremendous forces applied assymetrically to the slippers, the slippers cannot be used successfully if fabricated from oil impregnated bronze or other porous bearing material, which is too brittle and would disintegrate from flexures encountered. Therefore, complicated lubricated systems have to be provided for the slippers in conventional couplings, which, owing to the rapid wear of the slippers, quickly become clogged or otherwise fail in service to shorten further the life of the slippers.

As a result of these difficulties, conventional spindle couplings presently in use require considerable maintenance not only for frequent lubrication, but also for replacement of slippers at relatively short intervals. In order to remove the slippers of conventional couplings, it is necessary to completely remove the roll from the mill stand and to completely disassemble the couplings associated therewith in order to extract the worn slippers and spacer pin therefrom and to insert a new set of slippers and spacer pin. This procedure is time-consuming and not only entails considerable expense and labor to make the replacement, but also considerable down-time and loss of production at the rolling mill.

I overcome these undesirable features of the prior art by providing a universal coupling or joint which is self-aligning, dynamically balanced, and smooth and quiet in operation, in which wear and power consumption are minimized. More importantly, in the case of the very large and expensive spindle couplings in use in the steel industry, my novel coupling permits the continued use of the existing major components of the coupling. That is to say the very large forgings such as the coupling head and the spindle head can be employed in my novel coupling arrangement with slight modification. Similarly, the slipper and pin sets, although constituting a very minor amount of the first cost of each coupling can be modified in accordance with my invention for use with my novel coupling. Additional, self-aligning dynamically balanced antifrictional means for symmetrically transmitting torque and bearing forces are provided in my novel coupling arrangement which are not subject to the aforementioned stresses and breakage. Moreover, the slipper and pin set, as modified in accordance with my invention, is not subject to substantial wearing stresses and, therefore, need only be replaced at long intervals if at all. Instead, the aforementioned antifrictional torque-transmitting means are fabricated from facile replacement, and their longevity is expected to be many times that of the conventional slipper and pin sets.

Accordingly, means are provided by my invention for removing the aforementioned antifrictional means without disassembling the spindle coupling and thereby obviating the necessity of removing the roll from the mill stand or the like. My self-aligning antifrictional means are further arranged for self-lubrication to eliminate this aspect of maintenance and to eliminate the lubricant passages of conventional slippers, which passages increase manufacturing difficulties and are easily clogged during operation of the coupling. My novel coupling arrangement is capable of transferring asymmetrically delivered power from the spindle head to the spade head of the coupling (i.e., when the driving and driven axes are not coincident) without any stuttering or backlashing, owing to the configuration of the aforementioned self-aligning antifrictional means. This results from the provision of substantially symmetrical, and therefore dynamically balanced, components forming part of my self-aligning antifrictional means. Finally, the slipper and pin set as modified in accordance with my invention maintains the elements of my universal coupling in position during initial installation or replacement of the aforementioned antifrictional means between the juxtaposed surfaces of the coupling components. This is particularly advantageous in the case of the very large spindle couplings, mentioned above, inasmuch as the spindle coupling need not be dismantled and the use of a crane is not required to remove the slipper and pin sets as in the case of conventional couplings of this type. Moreover, the hazardous occupation of lubricating the conventional slippers by manually operated grease guns or the like is eliminated.

I accomplish these desirable results by providing a novel, universal coupling comprising a head member having a pair of spaced bifurcate portions, a cooperating head member having an axially extending blade member shaped to be loosely fitted between said bifurcate portions, an alignment pin mounted on said bifurcate portions and extending therebetween, said pin being shaped for closely fitted insertion into a slot in said blade, the juxtaposed surfaces of said bifurcate portions and said blade being spaced from one another, and self-aligning torque-transmitting antifrictional means inserted in the spaces between said juxtaposed surfaces, said antifrictional means including pairs of engaging bearing members having complementary engaging spherical or equivalent symmetrical surfaces so that torque forces are transmitted symmetrically through said self-aligning antifrictional means and between said head members. I further provide an alignment pin which is rotatably mounted adjacent its ends in a pair of spaced slippers respectively, said slippers being rockably mounted in said bifurcate portions and extending substantially between an adjacent pair of said antifrictional means. In still other applications, I further provide said self-aligning antifrictional means in the form of a bearing socket rockably mounted on one of said juxtaposed surfaces and a bearing slidably engaging the other of said juxtaposed surfaces.

During the foregoing discussion various objects, features and advantages of the invention have been set forth. These and other objects, features and advantages of the invention, together with structural details thereof, will be elaborated upon during the forthcoming description of certain presently preferred embodiments of the invention, together with presently preferred methods of practicing the same.

In the accompanying drawings, I have shown certain presently preferred embodiments of the invention and have illustrated certain presently preferred methods of practicing the same in which.

Figure 1:
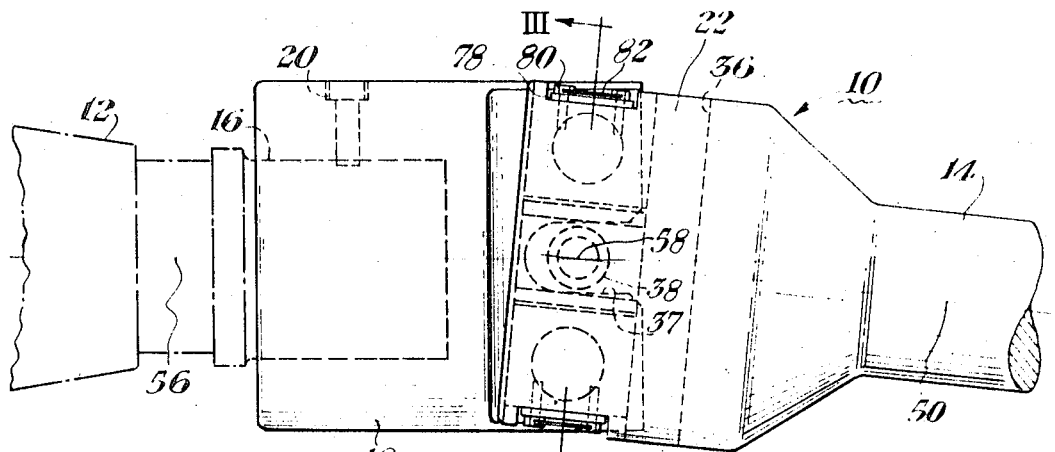
FIGURE 1 is an elevational view of a universal spindle coupling or the like arranged in accordance with the invention and having the driving and driven axes thereof misaligned.
Figure 2:
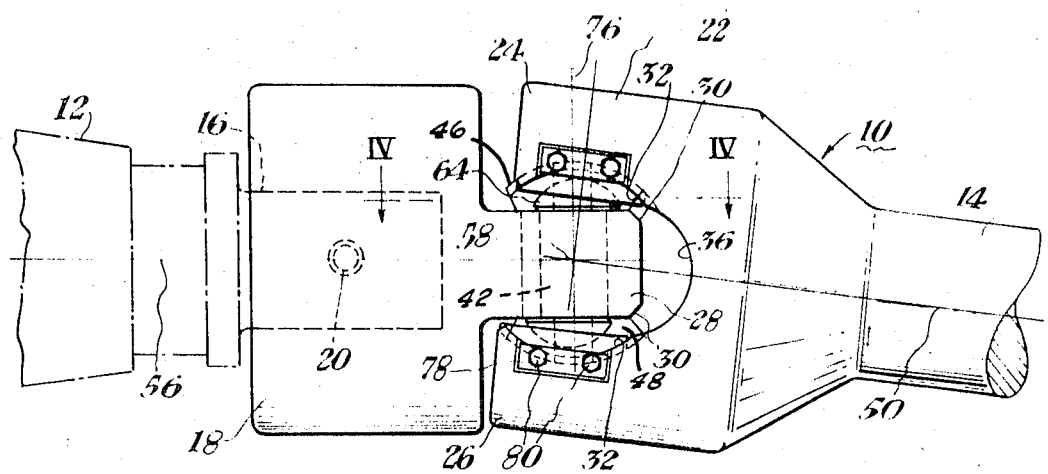
FIGURE 2 is a similar elevational view of the spindle coupling of FIGURE 1, wherein the coupling is rotated through an angle of 90°.
Figure 3:
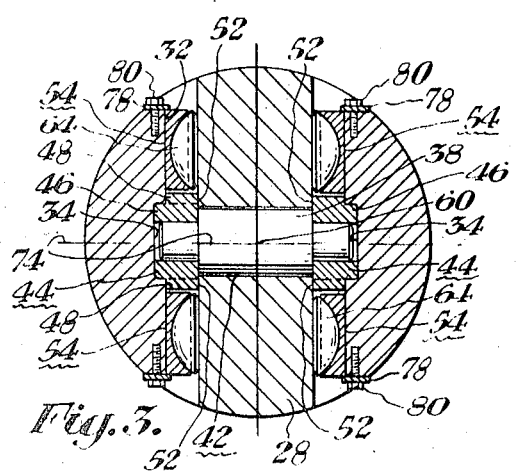
FIGURE 3 is a cross-sectional view of my novel coupling arrangement, as shown in FIGURE 1 and taken along reference line III—III thereof.

Referring now more particularly to the drawings and initially to FIGURES 1 to 3 thereof, the novel arrangement of my universal coupling 10 shown therein is utilized for transmitting power to a work roll or the like, a portion of which is designated at 12, from a suitable source of motive power (not shown) coupled to spindle portion 14. A spade-shaped end 16 of the roll 12 is fitted into accommodating recess in coupling head 18. A set screw 20 prevents displacement of the coupling head 18 from the spade end of roll 12. Spindle portion 14 terminates in spindle coupling head 22, which in this example is formed integrally therewith.

The spindle head 22 terminates in bifurcate portions 24 and 26 as better shown in FIGURE 2, while the coupling head 18 terminates in a centrally disposed blade or spade end 28 which is loosely inserted between the bifurcate spindle head portions 24 and 26. The leading edges of the blade 28 are chamfered at 30 to facilitate such insertion when novel self-aligning antifrictional means, described below, are inserted between the blade 28 and portions 24, 26. The juxtaposed surfaces of the bifurcate portions 24 and 26 are each provided with a transversely extending, cylindriform groove 32 shaped to accommodate the aforementioned self-aligning antifrictional means and a modified slipper and pin arrangement provided in accordance with my invention and described below. In furtherance of this purpose, the spindle head grooves 32 are each provided with an intermediate deepened portion 34 as better shown in FIGURE 3 of the drawings. The crotch area of the spindle head 22 is rounded and extended inwardly of the inserted blade 28, as denoted by reference character 36 and better shown in FIGURES 1 and 2 of the drawings. The coupling head blade 28 is provided with an intermediate slot 37 opening into the leading edges thereof as better shown in FIGURE 4 to accommodate a guiding and spacing pin 38, which is mounted in accordance with the invention on slippers 44 and rotated into position in grooves 32 of the bifurcate portions 24, 26. To facilitate positioning the pin 38 when the coupling components 18, 22 are assembled, the leading edges of the blade 26 are likewise chamfered at 40 and 41 as better shown in FIGURE 4.

The coupling components, viz, the coupling head 18 and the spindle head 22, as thus far described are conventional in nature and are customarily provided in the vast majority of existing universal spindles and couplings in use for driving the rolls of rolling mills. In this connection, it is well to point out that the spindle head grooves 32 are, therefore, adapted not only to accommodate a conventional slipper and pin arrangement (not shown), but also my novel self-aligning antifrictional means and modified pin and slipper set which will now be described. Thus my invention can be utilized only with a very slight alteration in the configuration of existing, conventional coupling heads to accommodate retainer plates 78 described below.

In order to initially space the blade 28 of the coupling head 18 intermediately of the bifurcate spindle head portions 24, 26, as shown in FIGURES 2 and 3, a modified slipper and pin arrangement designated generally by the reference character 42 is provided. The pin and slipper set 42 includes the aforementioned spacing pin 38 and a pair of slippers 44 shaped in accordance with my invention. Each of the slippers 44 includes a cylindriform and apertured body portion 46 and a pair of laterally extended wing segments 48 which also are similarly rounded and joined laterally to the body portion 46. The body portion 46 is thus adapted to sit in the deepened cylindriform section 34 of the transverse grooves 32 while the wing sections 48 extend respectively and oppositely into the shallower portions thereof. In this example each of the slippers 44 extends substantially the distance between an adjacent pair of self-aligning antifrictional means. The pin 38 is journalled at each end thereof into apertures formed respectively in the body portion of the slippers 44 as better shown in FIGURE 3. The slippers 44 are thus seated rockably in the transverse grooves 32 so that the flat surfaces of the slippers are always substantially aligned with the blade 28.

Accordingly, when the driving and driven axes 50 and 56 of the coupling 10 are not coincident, as shown in FIGURES 1 and 2, the point 58 of their intersection (FIGURES 1 and 2) will be at the center 60 of the pin 38, as better shown in FIGURE 3. That is to say, in FIGURE 1 the spindle head 22 has pivoted solely about the longitudinal pin axis, with respect to the coupling head 18, which in FIGURE 2 such pivoting occurs about the transverse axis of the pin 38. Between the typical positions of FIGURES 1 and 2, a hybrid of these pivotal motions occurs.

The pin and slipper set 42 is assembled with the spindle head 22 in the same manner as the aforementioned conventional slipper and pin set, i.e., the modified pin and slipper set 42 is inserted into the crotch 36 of the spindle head 22 with the pin axis generally coincident with the spindle axis 50. The deepened crotch area denoted by the reference character 36 in FIGURE 2 loosely receives one of the slippers 44 in the adjacent end of the pin until the slipper and pin set 42 can be rotated into substantially complete engagement with the grooves 32 and into a generally transverse position of the pin and slipper set 42 relative to the coupling head or roll axis 56. In furtherance of this purpose, the transverse grooves 32 and the rounded surfaces of the slippers 44 are preferably formed with cylindrical configurations with the axes thereof coincident with the center 58 of the pin 38 to facilitate revolving the slipper and pin set 42 about the aforementioned center 58 while in contiguous contact with the grooves 32.

Figure 4:
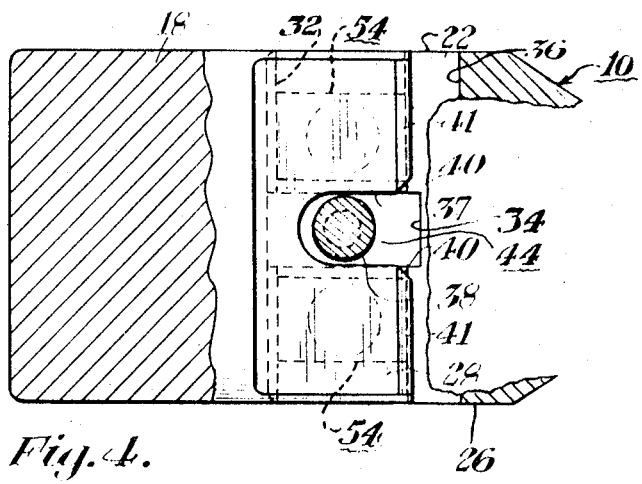
FIGURE 4 is a partial, longitudinally sectioned view of my novel universal coupling as shown in FIGURE 2 and taken along reference line IV—IV thereof.
Figure 5:
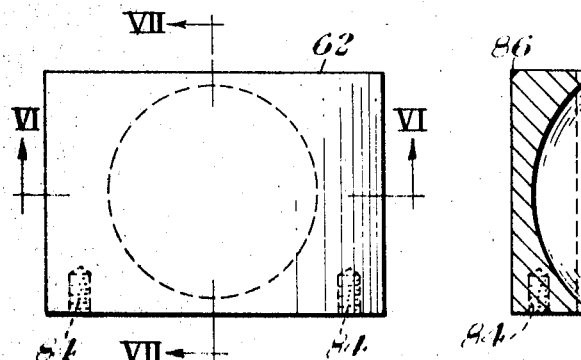
FIGURE 5 is an enlarged plan view of one of the bearing members as shown in FIGURES 1–3.
Figure 7:
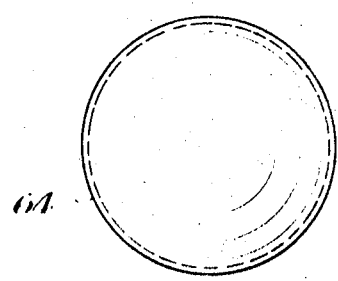
FIGURE 7 is a cross-sectional view of the bearing member as shown in FIGURE 5 and taken along reference line VII—VII thereof.

The coupling head blade 28 is then inserted between bifurcate portions 24, 26 so that the pin 38 is relatively closely fitted within slot 37 of the blade 28, as better shown in FIGURES 3 and 4. At the same time, the juxtaposed flat surfaces 52 of the slipper wing segments 48 position the blade 28 intermediately of the bifurcated portions 24, 26. Inasmuch as the slipper wing segments 48 extend only a relatively short distance into the shallower portions of the transverse grooves 32, the major proportions of these shallower groove areas are available to receive suitably shaped self-aligning antifrictional means 54 with four such means being employed in this one arrangement of the invention as better shown in FIGURE 3. The slipper wing segments 48, therefore, serve merely to position initially the blade 28 between the bifurcate portions 24 and 26, but do not serve as torque-transmission means.

The self-aligning antifrictional means 54 are arranged for the application of symmetrical load forces to the surfaces of the bearing components in order to minimize wearing thereof and to prevent their breakage. At the same time, the self-aligning antifrictional means 54 can be withdrawn from the associated portions of the transverse grooves without disassembling the entire coupling 10, for the reason that the aforementioned pin and slipper set 42 remains more or less permanently in place in the coupling 10 and is not subjected to wearing stresses.

Figure 8:
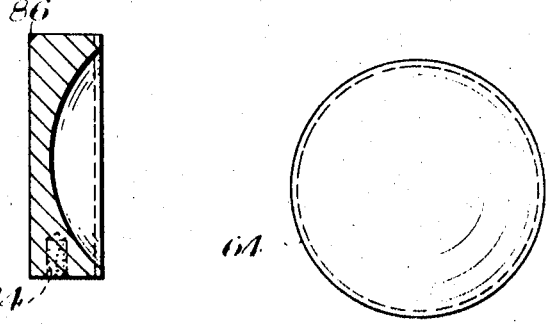
FIGURE 8 is an enlarged top plan view of one of the complementary bearing members as shown in FIGURES 1–3; and, FIGURE 9 is an elevational view of the complementary bearing member as shown in FIGURE 7.
Figure 6:
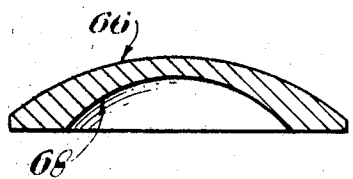
FIGURE 6 is a longitudinally sectioned view of the bearing member as shown in FIGURE 5 and taken along reference line VI—VI thereof.
Figure 9:
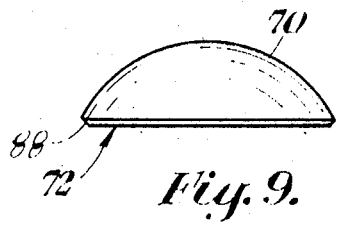

Referring now more particularly to FIGURES 3 and 5 to 8 of the drawings, a suitable arrangement of the antifrictional means 54 is illustrated in accordance with my invention. Accordingly, each antifrictional means 54 includes a bearing socket 62 (FIGURES 3, 5 to 7) and a planoconvex bearing 64 (FIGURES 3, 8 and 9). The bearing socket 62 is provided with a cylindriform top surface 66 (FIGURE 6) which is shaped complementarily with the adjacent portion of the associated transverse groove 32. Although the sockets 62 are slidably and rockably mounted in the grooves 32 very little rocking action will occur because of the different radii of the cylindrical surface 66 and the spherical socket 68. The bottom surface of each bearing socket 62 has a flat surface containing a spherical recess 68 formed therein for receiving a complementary spherical bearing surface, for example a spherical radius portion 70 of the planoconvex bearing 64. The apposed substantially planar surface 72 of the bearing 64 (FIGURE 9) is planar for engagement with the juxtaposed flat surface of the coupling head blade 28.

Accordingly, in the rotative positions of the spindle, coupling 10, adjacent that shown in FIGURE 2, relative sliding or rocking movement occurs between the bearing sockets 62 and the planoconvex bearings 64 and about their symmetrical bearing surfaces 70 to accommodate the angular disposition of the coupling head blade 28 relative to the spindle head bifurcate portions 24, 26 as better shown in FIGURE 2. At the same time longitudinal sliding movement occurs between the plane surfaces 72 of the bearings 64 and the juxtaposed surfaces of the blade 28. On the other hand, in all rotative positions of the coupling 10, the engagement of the flat wing segment surfaces 52 of the slippers 44 with the blade 28 will cause the slipper and pin set 42 to be disposed so that the long axis 74 of the pin 38 will remain in substantial coincidence with the transverse axis 76 (FIGURE 2) of the blade 28. Owing to the spherical contour of the surfaces 70 of the planoconvex bearings 64 and of the complementary recesses 68 of the bearing sockets 62, torque forces will be transmitted symmetrically through the bearings 64. By the same token, the reactional forces applied to the socket 62 will be symmetrical, and therefore, comparatively little rotative sliding action will occur between the bearing sockets 62 and the contacting surfaces of the transverse grooves 32. Accordingly little wear will occur in bores or grooves 32 of spindle head 22 of the bearing sockets 62. The symmetrical application of forces to the bearing components 62 and 64 eliminates development of bending stresses therein. More importantly, the tremendous wearing forces applied to conventional spindle couplings, which forces tended to flatten the cylindrical grooves 32 of the spindle head, are obviated by my invention.

Accordingly, substantially all of the wear forces occurring in the coupling 10 are confined to the bearing members 64. In furtherance of this purpose, the bearing socket 62 can be fabricated from a relatively harder structural material such as steel while the bearing members 62 are desirably fabricated from a softer bearing material such as bronze babbit, or a plastic material depending upon the specific application of the invention. Accordingly, the wearing action upon the socket surfaces 68 of the bearing member 62 and upon the juxtaposed flat surfaces of the blade 28 will likewise be largely eliminated. If desired, the life of the bearing socket 62 can be increased still further by providing a highly polished chromium plating or the like on the socket surfaces 68.

Desirably, the bearings 64 are fabricated from a self-lubricating oil or other lubricant impregnated bearing material such as sintered bronze or a laminated phenolic coated with Teflon. In this arrangement, then, the bearings 64 are self-lubricating throughout their useful lives. For example, the use of oil impregnated bearings such as the bearings 64 is made possible in contrast to previous practices by providing antifrictional means 54 in which the bearing forces are applied symmetrically from spindle head 22 to roll coupling head 18 through bearings 64. Such use is not possible in conventional couplings of this type owing to the tremendous bending forces which are applied to conventionally shaped slippers and which would almost immediately destroy such slippers if made from oil-impregnated bronze.

The driving or torque forces transmitted through the coupling 10 are almost entirely transferred from the spindle head 22 to the spade head 18 through the antifrictional means 54. Little or no force transmission occurs through the slippers 44, although they contact small areas of the blade 28 through their side or wing segments 48. Similarly, only the weight of the spindle head 22 and the adjacent portion of the spindle 14 is applied to the pin 38, which spaces the slippers 44 and maintains the coupling heads 18, 22 in general alignment. For this reason, the pin and slipper set 42 is not subject to substantial wearing forces and replacement thereof is seldom necessary. Accordingly, the coupling 10 need not be dismantled throughout the useful life of the coupling heads themselves.

On the contrary, substantially all of the wear in the coupling 10 occurs at the bearings 64 as aforesaid and these bearings can be readily replaced, as will now be described, without disengaging the coupling heads 18, 22 or otherwise dismantling the coupling 10.

During operation of the coupling 10, the bearing sockets 62 are retained within their associated groove portions, as shown in FIGURE 3, by means of respective retainer plates 78 and mounting bolts 80, as better shown in FIGURES 1 to 3. After the mounting bolts 80 are tightened, inadvertent loosening thereof can be prevented by wires 82 inserted through appropriate apertures in the heads of the bolts 80.

To remove the bearing sockets 62 and with them the bearings 64 seated therein, it is only necessary to remove the four retaining plates 78 and to withdraw the bearing socket 62 together with bearing 64. In furtherance of this purpose, each of the bearing sockets 62 desirably is provided with one or more tapped apertures 84 into which suitable eyebolts (not shown) can be threaded to aid in withdrawing the bearing socket 62. However, when such withdrawal is accomplished the remaining components of the coupling 10 remain in their positions as shown in FIGURES 1 to 4 owing to the restraining and spacing actions of the pin and slipper assembly 42, as described previously. The bearing sockets 62 are then provided with new bearings 64, and the antifrictional means 54 are reassembled with the coupling 10. To facilitate insertion between the bifurcate portions 24, 26 on the one hand and the blade 28, the leading edge of the bearing socket is chamfered at 86 (FIGURE 7) while the circumference of each bearing member 64 is chamfered adjacent its flat surface 72 as denoted by reference character 88. Of course, when the antifrictional means 54 are thus inserted, any force applied to the slippers 44 as result of their engagement with the adjacent surfaces of the blade 28 is transferred entirely to the antifrictional means 54.

Alternatively, when replacing the antifrictional means 54, both the bearings 64 and the bearing sockets 62 can be replaced concurrently depending upon the material from which the bearing sockets are fabricated and its durability in a given application. It will also be apparent that only one of the antifrictional means 54 can be withdrawn periodically for inspection purposes, since wear will be substantially identical in all of the antifrictional means 54.

From the foregoing it will be apparent that novel and efficient forms of universal coupling, joints and the like have been disclosed herein. While I have shown and described certain presently preferred embodiments of the invention and have illustrated presently preferred methods of practicing the same, it is to be distinctly understood that the invention is not limited thereto but may be otherwise variously embodied and practiced within the scope of the following claims.

I claim:

1. In a universal coupling, a combination comprising a head member having a pair of spaced bifurcate portions, a cooperating head member having an axially extending blade member shaped to be loosely fitted between said bifurcate portions, an alignment pin mounted on said bifurcate portions and extending therebetween, said pin being shaped for closely fitted insertion into a slot in said blade, the juxtaposed surfaces of said bifurcate portions and said blade being spaced from one another, and torque-transmitting antifrictional means rockably mounted independently of said pin in the spaces between said juxtaposed surfaces, said antifrictional means including pairs of engaging bearing members haivng complementary engaging symmetrical bearing surfaces so that torque forces are transmitted symmetrically through said antifrictional means and between said head members, each of said antifrictional means including a bearing socket slidably mounted on said juxtaposed surfaces and a bearing slidably engaging said bearing socket and the other of said juxtaposed surfaces, said bifurcate portions having transversely extending cylindrical groove means formed in the apposed surfaces thereof, said bearing sockets having complementarily shaped cylindrical surfaces seated slidably and respectively in said groove means, said groove means extending completely across said bifurcate surfaces, and slippers having complementary cylindrical surfaces seated therein respectively.

2. The combination according to claim 1 wherein the central portions of said groove means are provided with recessed cylindrical surfaces to accommodate complementarily projecting cylindrical surfaces of said slippers to prevent lateral movement thereof and to accommodate journals formed at the ends of said pin, and aperture means therefor formed in said slippers respectively at said projecting cylindrical surfaces.

3. In a universal coupling, a combination comprising a head member having a pair of spaced bifurcate portions, a cooperating head member having an axially extending blade member shaped to be loosely fitted between said bifurcate portions, an alignment pin mounted on said bifurcate portions and extending therebetween, said pin being shaped for closely fitted insertion into a slot in said blade, the juxtaposed surfaces of said bifurcate portions and said blade being spaced from one another, and torque-transmitting antifrictional means rockably mounted of said pin in the spaces between said juxtaposed surfaces, said antifrictional means including pairs of engaging bearing members having complementary engaging symmetrical bearing surfaces so that torque forces are transmitted symmetrically through said antifrictional means and between said head members, said pin being rotatably mounted adjacent its ends in a pair of spaced slippers respectively, said slippers being rockably mounted on said bifurcate portions and extending substantially between an adjacent pair of said antifrictional means, each of said slippers having a laterally extending wing section protruding and closely fitted into the adjacent space between said juxtaposed bifurcate and blade surfaces to provide temporary spacing means therebetween during installation and removing of said antifrictional means.

4. In a universal coupling, a combination comprising a head member having a pair of spaced bifurcate portions, a cooperating head member having an axially extending blade member shaped to be loosely fitted between said bifurcate portions, an alignment pin mounted on said bifurcate portions and extending therebetween, said pin being shaped for closely fitted insertion into a slot in said blade, the juxtaposed surfaces of said bifurcate portions and said blade being spaced from one another, and torque-transmitting antifrictional means rockably mounted independently of said pin in the spaces between said juxtaposed surfaces, said antifrictional means including pairs of engaging bearing members having complementary engaging symmetrical bearing surfaces so that torque forces are transmitted symmetrically through said antifrictional means and between said head members, each of said antifrictional means including a bearing socket slidably mounted on one of said juxtaposed surfaces and a bearing slidably engaging said bearing socket and the other of said juxtaposed surfaces, said bifurcate portions having transversely extending cylindrical groove means formed in the apposed surfaces thereof, said bearing sockets having complementarily shaped cylindrical surfaces seated slidably and respectively in said groove means, said pin being rotatably mounted adjacent its ends in a pair of spaced slippers respectively, said slippers being rockably mounted on said bifurcate portions and extending substantially between an adjacent pair of said antifrictional means.

5. In a universal coupling, a combination comprising a head member having a pair of spaced bifurcate portions, a cooperating head member having an axially extending blade member shaped to be loosely fitted between said bifurcate portions, an alignment pin mounted on said bifurcate portions and extending therebetween, said pin being shaped for closely fitted insertion into a slot in said blade, the juxtaposed surfaces of said bifurcate portions and said blade being spaced from one another, and torque-transmitting antifrictional means rockably mounted independently of said pin in the spaces between said juxtaposed surfaces, said antifrictional means including self-aligning bearing members having complementary engaging bearing surfaces so that torque forces are transmitted uniformly through said antifrictional means and between said head members, said bifurcate portions having transversely extending cylindrical groove means formed in the apposed surfaces thereof, said antifrictional means having complementarily shaped cylindrical surfaces seated slidably and respectively in said groove means, said pin being rotatably mounted adjacent its ends in a pair of spaced slippers respectively, said pin and said slippers extending between said groove means, and said slippers being rockably mounted on said bifurcate surface groove means respectively and extending substantially between an adjacent pair of said antifrictional means.

References Cited

UNITED STATES PATENTS

| | | | |
|---|---|---|---|
| 1,271,905 | 7/1918 | Jones | 64—6 |
| 2,260,567 | 10/1941 | Gatke | 64—7 |
| 2,324,700 | 7/1943 | Healy | 64—7 |
| 2,903,866 | 9/1959 | Nichols | 64—7 |
| 3,071,941 | 1/1963 | Voihs et al. | 64—7 |
| 3,205,680 | 9/1965 | Snyder | 64—7 |
| 3,138,412 | 6/1964 | Dole. | |
| 3,151,015 | 9/1964 | Griffith. | |

HALL C. COE, Primary Examiner